April 23, 1968 CHOKU TAKAHASHI ET AL 3,379,387

THREADING MEANS FOR A CARTRIDGE-TYPE TAPE RECORDER

Filed May 17, 1966

INVENTORS
CHOKU TAKAHASHI
TADASHI NISHIZAWA
BY
OSTROLENK, FABER, GERB & SOFFEN
ATTORNEYS

United States Patent Office 3,379,387

Patented Apr. 23, 1968

3,379,387

THREADING MEANS FOR A CARTRIDGE-TYPE TAPE RECORDER

Choku Takahashi and Tadashi Nishizawa, Tokyo, Japan, assignors to Nippon Electric Company Limited, Tokyo, Japan Filed May 17, 1966, Ser. No. 550,766
Claims priority, application Japan, May 19, 1965, 40/29,031, 40/38,957; June 16, 1965, 40/48,574
6 Claims. (Cl. 242—55.13)

ABSTRACT OF THE DISCLOSURE

This invention may be employed in tape recorders, motion picture projectors and any like device and broadly teaches a means for automatically threading a tape onto a tape take-up reel generally comprising a reel of tape positioned within a cartridge with the tape having a leader portion attached to its forward end. The leader has a widened front portion and when the tape storage reel unwinds, it urges the tape leader toward a take-up reel. Adjacent the take-up reel is a guide means which guides the widened front portion of the leader against the periphery of the take-up reel. The take-up reel has notches which are tilted such that when the take-up reel rotates in a direction to wind the tape around itself, the widened front portion of the leader slides into the notches and is trapped therein so that further rotation of the take-up reel causes the tape to be wound thereon. The supply reel is provided with a biasing spring which normally biases the leader against its own biasing force to restrain the leader from unwinding from the cartridge. Marker means are provided on the leader near its trailing edge to indicate to a suitable detector means that the widened portion of the leader strip has been captured by the notches and to disengage the roller drive means from the tape in the cartridge.

This invention relates to a means for automatically threading a tape on a tape take-up reel and, more particularly, to automatic threading means for a cartridge type magnetic tape recorder.

This disclosure is specifically concerned with a magnetic tape recorder. However, once this disclosure is read, the applicability of the present invention to other situations where automatic threading of tapes is required, e.g. in motion picture projectors, will be apparent to those skilled in the art.

In magnetic tape recorders two tape reels are positioned on the tape deck of the tape recorder housing. One reel stores the tape. The operation of the recorder requires that the tape be moved through the recording and playback mechanism and that it then be threaded onto and wound up on the other or take-up reel.

In conventional magnetic tape recorders, the free or outward end of the recording tape on the storage reel is manually threaded onto the second reel. Manual threading can be difficult for those without agile fingers and always requires that a human operator be present to perform the extra step of threading the tape.

The present invention provides a means for automatically threading the free end of a tape on a tape take-up reel. Generally, a cartridge is provided which has a feed reel, or spool, within it. A length of flexible magnetic tape is wound about the feed reel. A tape leader comprised of another length of flexible tape is secured to the free, outer end of the magnetic tape. The leader is a resilient strip of material having a rigidity which biases it such that it normally assumes a normally flat, extended condition. The free end of the leader has a widened, slightly tapered portion.

A tape take-up reel is rotatably mounted on a second spindle and has side plates which are held together by a tape receiving spool. The side plates have at least one set of notches. Each set of notches comprises a single notch in each side plate. Each notch is in alignment with the other notch in the set. The notches open at, and extend inwardly, from the periphery of the side plates toward the tape receiving spool and are tilted at an angle, whereby when the take-up reel rotates in the direction which winds the tape thereon, the closed end of the notches is traveling behind the open end.

The operating mechanism of the tape recorder causes the tape storage reel to rotate in a direction that unwinds the tape. The resilient leader attached to the end of the tape is thereby fed out of the cartridge holding the storage reel. The leader automatically threads through the recording and playback means and passes to the take-up reel.

A guiding means adjacent the periphery of the take-up reel biases the widened front portion of the leader against the periphery of the side plates. This widened portion at the front of the leader slides into one of the sets of notches on the take-up reel after that reel begins to rotate and the notches pass the front portion of the leader. The tape is now threaded. Further rotation of the take-up reel winds the leader and then the tape itself onto the take-up reel.

When the tape is later rewound on the storage reel, as the widened front portion of the leader comes around to the point where it should separate from the take-up reel, it merely slips out of the notches, thus freeing the tape from the take-up reel.

Accordingly, it is a primary object of the present invention to provide a means for automatically threading a tape on a tape take-up reel.

It is a second object of the present invention to provide a means for threading a tape on a take-up reel which precludes the necessity of manually threading the tape on the take-up reel.

It is another object of the present invention to provide a means for automatically threading the magnetic tape in a cartridge type magnetic tape recorder.

It is another object of the present invention to provide a means for automatically threading a tape take-up reel by adding a simple element to the end of a length of tape and by providing notches in the take-up reel so that the notches can trap the added element, thereby automatically threading the tape on the take-up reel.

It is another object of the present invention to provide a novel tape containing cartridge adapted so that the tape therein can be automatically threaded on a take-up reel.

These and other objeects of the present invention will become apparent when consideration is given to the following description of the accompanying drawings in which.

Figure 1:
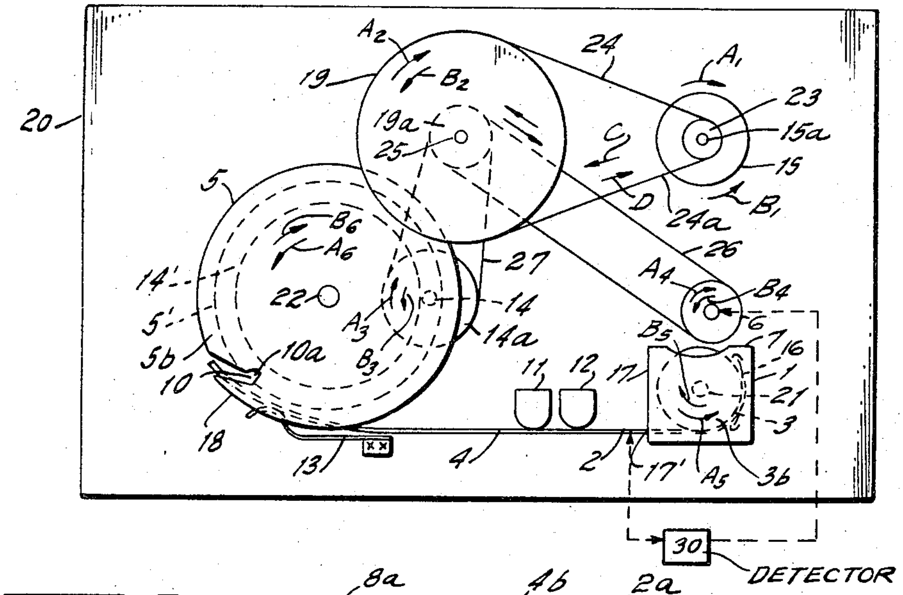
FIGURE 1 is a schematic plan view of a tape recorder adapted with the automatic threading means of the instant invention.
Figure 2:
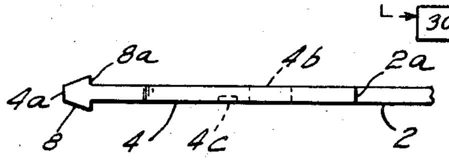
FIGURE 2 is a bottom view of a leader, shown attached to the tape being threaded, employed in the automatic threading means of the instant invention.

FIGURE 1 shows a tape recorder housing 20 having a removable cartridge 1. The cartridge has side walls which define an internal area 1*a*. Within the cartridge is disposed a supply or storage reel 3 on the spool of which is wound a roll of flexible magnetic recording tape 2.

Within the internal space 1*a* there may be a separable reel having side plates and a spool about which is wound the tape 2 or there might be merely a spool about which the tape is wound. In the latter case, the configuration of the internal space 1*a* will cause the tape to retain its position around the spool.

The tape 2 has an outward end 2*a* and an inward end. The top and side walls of the cartridge 1 are provided with an opening 7 having recesses 7*a* in opposing side walls to permit the hereinafter described roller 6 to engage both the reel 3 and the hereinafter described leader 4 in order to rotate the reel both in the clockwise and counterclockwise directions. The recorder assembly may be provided with a spindle 21 extending out of it onto which the cartridge might be mounted and about which the reel 3 might rotate. Alternatively, the cartridge itself might have the spindle 21 within itself.

The cartridge 1 has a second opening 17′ in one side wall 17. Extending through the side wall into area 1*a* is an opening 9. The function of the opening 9 will be considered after the tape leader guide 4 has been discussed.

Also disposed within the space 1*a* is a biasing means 16 which is affixed within the cartridge and which serves to bias the leader 4 in a manner which will be discussed after the leader 4 has been considered.

Attached to the free or outward end 2*a* of the tape 2 is a tape leader 4. Leader 4 has approximately the same width as the tape 2 over substantially all of its length. However, adjacent to the free end 4*a* of the leader 4 is a widened front portion 8 of the leader which, as will be described below, engages the take-up reel 5 to effect automatic threading of the tape 2. The portion 8 is tapered narrower toward the end 4*a* of the leader.

The leader 4, like the tape 2, is comprised of a flexible material. The material forming the leader has a resiliency sufficient to normally remain in a flat extended condition. The resiliency of the material permits the leader to be urged, without buckling, toward the take-up reel 5 solely by the unwinding rotation of the reel 3 in a clockwise direction as viewed in FIGURE 1, under control of the driving roller 6. The leader may, for example, be comprised of a polyethylene plastic or of a polyester film, such as that sold under the trademark "Mylar," or of other materials well-known in the art which would have the properties of resiliency and rigidity required in the leader 4.

Since the leader is resilient and normally seeks to maintain its flat extended condition, a guide or biasing means 16, preferably a leaf spring, is provided in space 1*a* to apply pressure to cause the leader 4 to wind about the reel 3. Biasing means 16 preferably has a normal uncharged position which places it between the side plates 3*a* and 3*b* of the reel 3. Alternatively, the biasing means 16 might normally be positioned near the peripheral edges of the side plates 3*a* and 3*b* while not being between them, or might normally be lightly biased against the peripheral edges of the reel 3. In any event, when the normally extended resilient leader 4 is wound onto the reel 3, it would have a natural tendency to coil very loosely about it. Were the leader 4 only coiled loosely, upon unwinding (clockwise) rotation of the reel 3 which should feed the leader out of the aperture 17′, the reel would just uselessly continue to rotate causing the tightly coiled tape to become progressively looser while the resilient leader would not feed out of the aperture 17′. The biasing means 16 also prevents friction between the coiled leader 4 and the interior of the side walls of the cartridge due to uncoiling of the tape leader while it is within the cartridge by maintaining alignment of the leader strip inside the cartridge. When the cartridge 1 is loaded with a full roll of tape 2 with the leader attached, the biasing means 16 bows and exerts a pressure on the outermost layer of the coiled leader 4. The pressure is greatly decreased to become substantially nil and the shape of the biasing means 16 becomes substantially linear (as shown in FIGURE 3) at the moment the tape leader is completely uncoiled and unwound from the reel 3.

Figure 3:
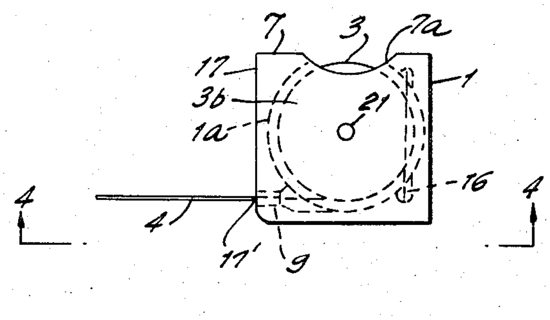
FIGURE 3 is a side view of a tape containing cartridge adapted with some of the features of the instant invention.
Figure 4:
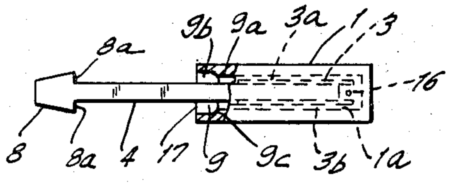
FIGURE 4 is a view in the direction 4—4 of FIGURE 3 with the wall of the cartridge partially broken away.

Referring to FIGURES 3 and 4, the opening 9 is shown as having two portions, a narrow portion 9*a* and a wider portion 9*b* forming the shoulders 9*c* therebetween. When the tape 2 and, hence, the leader 4 are wound onto the reel 3, unless the free end 4*a* of the leader 4 is prevented from slipping into the internal space of the cartridge, when it is desired to have the tape fed out of the cartridge, the tape will not be able to exit through the aperture 17′. Some means is, therefore, needed to prevent the leader 4 from completely entering the internal area 1*a*. Cartridge shoulders 9*c* abut leader shoulders 8*a*, preventing entry of portion 8 of the leader 4 into the cartridge interior. Consequently, the tape can be rewound only until the portion 8 is within the opening 9. The portion 9*b* of the opening 9 also serves as a protective housing for the portion 8 when the cartridge 1 is not in use, protecting the portion 8 from being damaged or broken off.

When the reel 3 rotates in a clockwise direction and unwinds the leader 4, the leader is fed out through the aperture 17′ and passes through the erasing and read-record means, illustrated in block form respectively, at 12 and 11. The leader then passes to the hereinafter described biasing means 13 which biases it against the periphery of the take-up reel 5.

The leader 4 should at least be as long as the distance between the spindle 21 and the spindle 22 and preferably of a length to permit its being biased by spring means 16 and 13 simultaneously when in the position shown in FIGURE 1. This ensures that the leader 4 is enabled to perform its function in the threading process. Preferably, the leader should have a length equal to an integral number multiple of the periphery, i.e. the circumference, of the tape receiving spool 5′ of the hereinafter described take-up reel 5. This supresses wow and flutter when the tape is played back. In a preferred embodiment, the distance between the spindles 21 and 22 is smaller than the circumference of the spool 5′ so that the integral number multiple is unity.

The take-up reel 5 has side plates 5*b* (FIGURE 1), which have a peripheral edge 18 and which are spaced apart and are connected to each other by the spool 5′. The spool 5′ has a smaller diameter than the diameter of the side plates 5*b*. The spacing between the side plates is wide enough to admit the tape 2 and the narrow portion of the leader 4. However, the portion 8 of the leader is wider than the spacing between the side plates for reasons discussed below.

The reels 3 and 5 are substantially coplanar.

Cutting into the peripheral edges and extending through the side plates toward the spindle 22, is at least one set of notches 10. Each set of notches consists of a notch in each side plate 5*b*. The notches in each set of notches should be in substantial alignment. Preferably, every point in the notch 10 in one side plate corresponds exactly to a point in the notch 10 in the other side plate; and a line joining any corresponding points in the side plates 5*b* will be parallel to the direction of the spindle 22. For best operation the notches 10 should extend inward along the side plates past the periphery of the spool 5′. In FIGURE 1, the closed portion 10*a* of the notch 10 is closer to the spindle 22 than is the open portion of the notch near the periphery of the spool 5′.

The notch 10 preferably does not extend along a line joining the spindle 22 with the peripheral edge 18 of the reel 5. It is tilted at an angle such that when the reel 5 is rotating, e.g. in a clockwise direction, the open portion of the notch 10 closer to the peripheral edge 18 leads to the operative portions of the notch 10 which are closer to the spool 5′.

When the front portion 8 of the leader 4 approaches the take-up reel 5, it is guided by the guide 13 against the periphery 18 of side plates 5*b*. The guide 13 is mounted to the housing 20. The guide means 13 might be comprised of a leaf spring which biases the portion 8 against the periphery 18 of the side plates.

The portion 8 rides along the peripheral edge 18 of the side plates as the reel 5 rotates clockwise until a set of notches 10 rotates adjacent the portion 8. The portion 8 is biased by the means 13 into the notches 10. Further rotation of the reel 5 causes the portion 8 to slide into the notches 10 and against the periphery of the spool 5'. Because of the angle of tilt of the notch 10, the portion 8 is trapped in the notch and continued rotation of the reel 5 in a clockwise direction winds first the leader 4 and then the tape 2 around the spool 5'.

While only a single set of notches 10 is shown in FIGURE 1, additional sets of notches can be angularly spaced around the peripheral edge 18 of the reel 5, whereby the interval between the time the portion 8 first contacts the periphery and the time that it slips into a set of notches will be reduced.

When the tape 2 is rewound on the reel 3 by a counterclockwise rotation of that reel, and the tape and leader 4 are completely unwound from the reel 5, the portion 8 of the leader 4 slips out of the notch 10, thereby automatically disengaging the tape from the take-up reel.

From the foregoing it can be seen how the novel leader of the instant invention acts in conjunction with a specially designed take-up reel to automatically thread tape on the take-up reel.

A mechanism for operating the tape recorder described above is schematically illustrated in FIGURE 1.

The motor 15 has a rotatable shaft 15*a*. Mounted on the shaft is the pulley 23. The shaft 15*a* will rotate the pulley 23 in either rotational direction $A_1$ or rotational direction $B_1$. Belt 24 is mounted around pulley 23 and around pulley 19 and connects the two pulleys. Rotation of pulley 23 in direction $A_1$ causes belt 24 to move in direction C, which is the tape rewind direction. Rotation of pulley 23 in direction B causes belt 24 to move in direction D, which is the threading, recording and playback direction.

Rotation of pulley 23 in direction $A_1$ causes pulley 19 to rotate in direction $A_2$. Similarly, rotation of pulley 23 in direction $B_1$ causes pulley 19 to rotate in direction $B_2$.

Pulley 19 is mounted on shaft 25 and causes same to rotate when pulley 19 rotates. Also mounted on shaft 25 is another pulley 19*a*. Shaft 25 causes pulley 19*a* to rotate in the same direction, either $A_2$ or $B_2$, as pulley 19.

Belt 26 joins pulley 19*a* with roller 6 such that when pulley 19*a* rotates in direction $A_2$, roller 6 rotates in direction $A_4$ and when pulley 19*a* rotates in direction $B_2$, roller 6 rotates in direction $B_4$. Direction $B_4$ is the tape threading, recording and playback direction; and direction $A_4$ is the tape rewind direction. Belt 27 joins pulley 19*a* with pulley 14*a*. Rotation of pulley 19 in direction $A_2$ causes pulley 14*a* and idler 14 through pulley 19*a* to rotate in direction $A_3$ and rotation of pulley 19 in direction $B_2$ causes pulley 14*a* and idler 14 to rotate in direction $B_3$.

The motor 15 is connected with a lever mechanism and switches (not shown) that has four alternative operative positions. An operator (not shown) controls the choice of positions.

In the first position the operating mechanism is out of contact with both reels and, hence, neither reel rotates. In the second or threading position, the roller 6 is brought into contact with the reel 3 by the lever mechanism enabling the roller 6 to cause the reel 3 to rotate. Since in the second position it is desired to cause the tape to be threaded, the motor 15 causes the pulley 23 to rotate in direction $B_1$, thereby rotation pulley 19 in direction $B_2$, thereby rotating roller 6 in direction $B_4$, thereby causing reel 3 to rotate in direction $B_5$, which is clockwise, as viewed in FIGURE 1, and which causes the leader 4 and the tape 2 to unwind from the reel 3, thereby unwinding the leader 4 and urging it toward the take-up reel 5.

Note that the roller 6 engages the reel 3 around its periphery. When the leader 4 is wound on the reel 3, in spite of the resiliency of the leader, it will not feed out of the cartridge aperture 17' when the tape is unwound due to spring bias means 16. The roller 6 presses against the leader 4 causing it to unwind and feed out of the cartridge. In the situation where the reel 3 has no side plates, the roller will also press against the tape 2, causing it to unwind. Where the reel 3 has side plates, once the leader 4 is unwound, the roller 6 will rotate the reel 3 by pressing against the periphery of those side plates.

When the reel 3 has rotated sufficiently so that the leader 4 has arrived at the guide means 13, and is in a position where the means 13 is guiding the portion 8 of the leader against the peripheral edge 18 of the reel 5, a detector in the vicinity of the guide means 13 senses that the portion 8 is being guided by the means 13 and causes the lever means to disengage the roller 6 from the reel 3, thereby halting further unwinding of that reel. The detector 30 may be a photoelectric device which responds to the difference in transparency of the leader and a portion 4*b* of the leader provided for this purpose; or might be a device which detects the movement of the guide means 13 (when the guide means is a biasing means) as it is charged by the portion 8; or might be a microswitch which detects the presence of a recess 4*c* in leader 4; or any other detector device known in the art.

The second position of the lever means might, alternatively, also include having the lever means move the idler 14 into contact with the pulley 14', which is connected to the reel 5. Then, rotation of pulley 23 in direction $B_1$ causes pulley 19 to rotate in direction $B_2$, causing pulley 14*a* to rotate in direction $B_3$, which causes the idler 14 to similarly rotate in direction $B_3$, thereby causing the take-up reel 5 to rotate in direction $B_6$. The idler 14 would be causing the reel 5 to rotate in direction $B_6$ while the reel 3 was rotating in direction $B_5$. When the portion 8 of the leader 4 is guided by means 13 against the peripheral edge 18 of the reel 5, the already rotating reel 5 continues to rotate and a passing set of notches 10 traps the portion 8. There is no requirement that the reel 3 cease rotating by having roller 6 removed from reel 3 before the completion of the tape threading process.

The third position of the lever means might automatically follow when operation in the second position ceases or might be independently initiated by the operator. It is the recording or playback stage. In the third position, which results in the same transfer of motion from pulley 23 to reel 5 as occurred in the second alternative for the second position, the lever means (not shown) brings the idler 14 into contact with the pulley 14'. The pulley 14' is connected with the reel 5. Therefore, the rotation of the idler 14 in direction $B_3$ causes rotation of the reel 5 in direction $B_6$.

In the fourth position of the lever means, the tape rewind position, the idler 14 is disengaged from the pulley 14' while the roller 6 is engaged with the reel 3 by the lever means. Pulley 23 is now caused to rotate in direction $A_1$, causing pulley 19 to rotate in direction $A_2$, which causes pulley 6 to rotate in direction $A_4$, causing reel 3 to rotate in direction $A_5$, thereby unwinding the tape from reel 5 and rewinding it onto reel 3. The roller 6 thus causes the reel 3 to rotate to rewind the tape 2 on the reel 3.

From the foregoing it can be seen that we have provided a novel means for automatically threading a tape on a tape take-up reel generally comprising a reel of tape positioned within a cartridge with the tape itself having a leader portion attached to its forward end. The leader has a widened front portion and when the tape storage reel unwinds, it urges the tape leader toward a take-up reel. Adjacent the take-up reel is a guide means which guides the widened front portion of the leader against the periphery of the side plates of the take-up reel. The take-up reel has notches which are tilted such that when the take-up reel rotates in a direction to wind the tape around itself, the widened front portion of the leader slides into the notches and is trapped there so that further rotation of the take-up reel causes the tape to be wound around itself. In this manner a tape is automatically threaded onto a take-up reel.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. An automatic tape feed apparatus comprising:

a tape cartridge including a cartridge housing, a tape supply reel rotatably mounted within said cartridge, and a tape wound about said supply reel;

a recess in said cartridge housing exposing a plurality of the outermost layers of said wound tape;

a tape leader strip having a forward and a rearward end;

said rearward end being secured to the outermost end of said wound tape;

a major portion of said leader strip being substantially the same width and having the same order of thickness as said tape;

a portion of the forward end of said leader having a width substantially greater than the major portion of said leader strip to form shoulders along opposite edges of said leader strip which joins the wider and narrower portions thereof;

said leader strip being formed of a resilient material normally maintaining said strip in a flat extended condition when unwound and having a stiffness substantially greater than said wound type;

a take-up assembly positioned a spaced distance of said cartridge comprising;

a rotatably mounted take-up reel;

a pair of plates secured on opposite sides of said take-up reel, each of said plates having a notch forming a pair of first projecting means for engaging the shoulders provided along the edges of said leader strip;

means adjacent said plates for biasing said leader strip toward said take-up reel as said take-up reel is being unwound;

bias means being provided in said cartridge housing being urged against the outermost layer of said leader strip for maintaining said leader strip in said cartridge when in the fully wound condition;

first drive means positioned adjacent the recess in said cartridge housing for frictionally engaging and thereby unwinding said leader strip from said cartridge against the force of said bias means;

said bias means being mounted to reduce the biasing force applied to said wound tape so as to be substantially nil when said leader strip is unwound from said supply reel;

second drive means comprising means for rotating said take-up assembly for causing said projecting means to engage the shoulders of said strip so as to wind said leader strip and said tape about the take-up reel.

2. The apparatus of claim 1 wherein the length of said leader strip is at least equal to the distance between the center of rotation of said supply reel and the center of rotation of said take-up reel;

the periphery of said take-up reel receiving and engaging said leader strip being at least equal to said distance.

3. The apparatus of claim 2 wherein said leader strip is equal to integral multiples of said periphery.

4. The apparatus of claim 1 wherein said bias means is a substantially flat elongated leaf spring mounted in said cartridge housing so that its intermediate portion engages and is flexed by said leader strip when any portion of said leader strip is wound about said supply reel;

the ends of said leaf spring being so positioned in said cartridge housing as to reduce its biasing force against the wound tape to be substantially nil when said leader strip is fully unwound from said supply reel.

5. The apparatus of claim 1 wherein said cartridge housing is provided with an opening for said leader strip and said wound tape between said supply reel and the exterior of said cartridge housing;

said opening being of a sufficient width to receive the wide portion of said leader strip and narrowing to form a shoulder spaced inwardly from the outer surface of said cartridge housing by a distance sufficient to permit the forward portion of said leader strip to be fully contained within said cartridge housing, while at the same time preventing said forwardmost portion from being fully wound about said supply reel.

6. The apparatus of claim 1 wherein said leader strip is provided with a marking located near its rearward end;

detector means positioned between said cartridge housing and said take-up reel for detecting the presence of said marking as it passes said detector means for disengaging said first drive means from the tape yet to be unwound in said cartridge housing as said marking passes said detector means.

References Cited

UNITED STATES PATENTS

| | | | |
|---|---|---|---|
| 2,978,198 | 4/1961 | Bierman | 242—55.12 |
| 3,090,574 | 5/1963 | Doncaster et al. | 242—55.13 |
| 3,150,840 | 9/1964 | Briskin et al. | 242—55.13 |
| 3,208,682 | 9/1965 | Pastor et al. | 242—55.12 |
| 3,214,108 | 10/1965 | Louzil | 242—55.13 |
| 3,254,856 | 6/1966 | Camras | 242—55.13 |
| 3,306,545 | 2/1967 | Vogler et al. | 242—55.13 |

GEORGE F. MAUTZ, *Primary Examiner.*